United States Patent [19]

Elamin

[11] Patent Number: 5,575,541
[45] Date of Patent: Nov. 19, 1996

[54] AIR SUPPLY SYSTEM AND METHOD WITH ENHANCED PURGE CAPACITY

[75] Inventor: Naman A. Elamin, Lorain, Ohio

[73] Assignee: AlliedSignal Truck Brake Systems Co., Elyria, Ohio

[21] Appl. No.: 494,450

[22] Filed: Jun. 26, 1995

[51] Int. Cl.[6] .................................................. B60T 17/00
[52] U.S. Cl. .............................. 303/1; 55/218; 303/85
[58] Field of Search ........................... 303/1, 85; 55/316,
55/218; 96/109, 116, 144, 113, 114, 137;
137/204; 34/80; 60/307

[56] References Cited

U.S. PATENT DOCUMENTS

| | | |
|---|---|---|
| 4,316,640 | 2/1982 | Cripe . |
| 4,549,888 | 10/1985 | Fannih ........................................ 96/113 |
| 4,586,584 | 5/1986 | Auman et al. . |
| 4,673,222 | 6/1987 | Knight . |
| 4,764,189 | 8/1988 | Yanagawa et al. ........................ 96/144 |
| 4,816,047 | 3/1989 | Neal .......................................... 96/137 |
| 4,877,294 | 10/1989 | Kuhn et al. . |
| 4,900,098 | 2/1990 | Kuhn et al. . |
| 5,027,529 | 7/1991 | Cramer et al. . |
| 5,036,961 | 8/1991 | Eberling et al. . |
| 5,046,786 | 9/1991 | Johnston et al. . |
| 5,061,015 | 10/1991 | Cramer et al. . |
| 5,066,317 | 11/1991 | Gross et al. . |
| 5,145,495 | 9/1992 | Elamih ....................................... 96/114 |
| 5,186,522 | 2/1993 | Spencer . |
| 5,307,836 | 5/1994 | Niceley ...................................... 303/85 |
| 5,435,422 | 7/1995 | Chille, Sr. ................................ 188/352 |
| 5,458,676 | 10/1995 | Herbst et al. ............................. 96/109 |

*Primary Examiner*—Douglas C. Butler
*Attorney, Agent, or Firm*—Howard G. Massung

[57] ABSTRACT

An air supply system for a motor vehicle air brake system incorporating a desiccant type air dryer. The purge capacity of the air dryer is enhanced providing greater water and contaminant removable characteristics for the air dryer. The system incorporates a pressure reducing element and a control system for the system compressor causing air passing through the air dryer to be at a higher pressure than that necessary for charging the system reservoir. The higher pressure air supplied to the air dryer provides greater volumetric capacity for the purge volume of the air dryer. In this way an air dryer purge volume of a given size provides a greater purge capacity.

10 Claims, 3 Drawing Sheets

AIR SUPPLY SYSTEM AND METHOD WITH ENHANCED PURGE CAPACITY

BACKGROUND OF THE INVENTION

This invention relates to a component for a motor vehicle air brake system, and particularly, to an air supply system which provides enhanced air dryer capacity.

Many motor vehicles and in particular heavy duty trucks incorporate air brake systems which use air pressure to control application of the vehicle service brakes. These systems have an air compressor driven by the vehicle engine which charges a brake system reservoir with high pressure air. The air compressor is controlled to supply air intermittently as needed to replenish the reservoir and maintain reservoir pressure within a predetermined range.

The process of compression of air results in the precipitation of water. Water and particulates in the air brake system can lead to component deterioration and interfere with optimal operation of the brake system. Accordingly, there are various devices used for removing water from the compressed air in air brake systems, known as air dryers. The function of an air dryer is to collect and remove air system contaminants in solid, liquid and vapor form before they enter the brake system. The air dryer provides clean, dry air for the components of the brake system which increases the life of the system and reduces maintenance costs. One type of air dryer incorporates a desiccant material which eliminates daily manual draining of water collection reservoirs as is required in other types of air dryers.

Desiccant type air dryers employ a volume of desiccant material which is hydrophilic and thus absorbs water which passes through an air line from the air compressor. High pressure air enters the desiccant air dryer and the water is stripped by the desiccant material. The air dryer also includes a particulate filter for trapping particulates and oil. Eventually, the desiccant material absorbs water to its maximum capacity. As a means of expelling this trapped water, modern desiccant type air dryers incorporate a backflow or purge air flow as a means of stripping the desiccant of absorbed water. A reservoir referred to as a purge volume is provided with is charged with the high pressure air supplied by the compressor. When the compressor cycles from a loaded mode producing compressed air to the unloaded mode, the purge volume air is allowed to leak to atmosphere through the desiccant bed in a reverse flow direction, stripping it of moisture and expelling it into the air. External purge volume air dryer types use a purge volume reservoir separate from the air dryer and connected to it by an air line. Another type is a so-called integral purge volume type in which the housing which contains a desiccant material also defines the purge volume. These types are in widespread use today and provide excellent performance.

The purging capacity of an air dryer is a significant characteristic which refers to the efficiency with which water trapped by the desiccant is removed during the purge cycle. This purge efficiency is a function of the size of the purge volume. One approach toward increasing purge capacity is to enlarge the purge volume. In the case of either an air dryer with an integral purge volume or a separate purge volume reservoir such requirement results in a larger component being mounted to the vehicle. Enlargement of these components is not always feasible in view of packaging constraints. This is especially true in the case of air dryers having an integral purge volume since there are additional constraints on where they can be mounted.

In view of the foregoing, an object of this invention is to provide an air supply system incorporating an air dryer having a purge volume with enhanced purge capacity without requiring an increase in the overall size of the device.

SUMMARY OF THE INVENTION

In accordance with the present invention, an air supply system is implemented in which air is supplied and maintained in an air dryer at a higher pressure than is required for charging the brake system reservoir. Through the use of a pressure reducing valve, the reservoir receives air at the desired pressure. By charging the air dryer and purge volume at a higher pressure, a purge volume of a given size can deliver more air for purging during the purge cycle as it is expanded to atmosphere. These features can be provided for many designs of air dryers and is especially advantageous for air dryers incorporating an integral purge volume.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
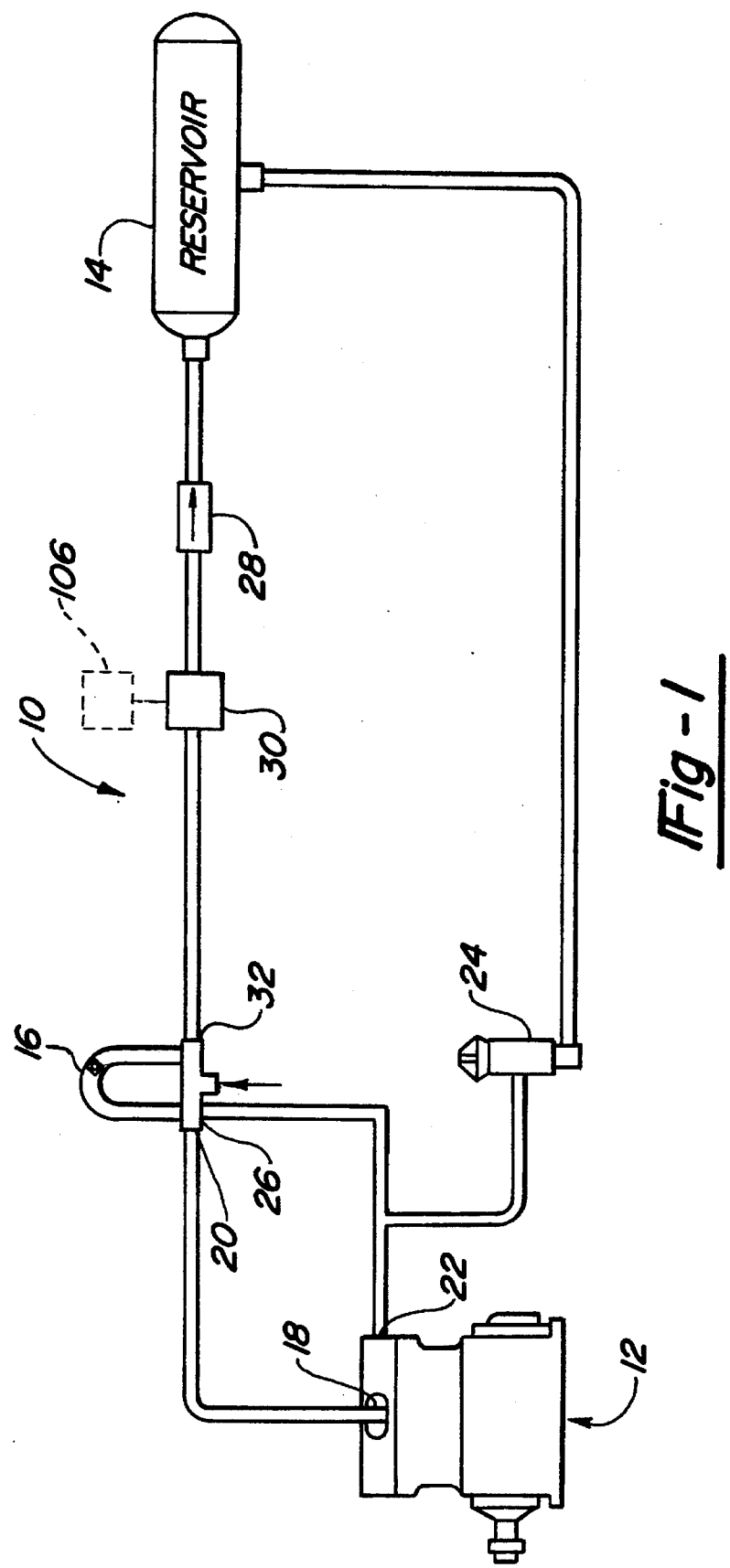
FIG. 1 is a schematic diagram of the air supply system in accordance with the present invention with parallel lines between system components designating air flow lines.

An air supply system in accordance with this invention is generally designated by reference number 10 and shown in FIG. 1. Compressor 12 is an on-board air compressor within the motor vehicle of a conventional type for providing pressurized air for charging brake system reservoir 14. As in the case of conventional air supply systems, air dryer 16 is provided for cleaning and dewatering compressed air before it is delivered to reservoir 14. As mentioned previously, this is provided to protect brake components within the vehicle from the harmful effects from water and other contaminates. Compressor discharge port 18 delivers high pressure compressed air to air dryer supply port 20. Compressor control port 22 receives an air pressure signal for causing compressor 12 to cycle between a loaded condition producing compressed air to an unloaded condition in which it is not producing compressed air.

Cycling of compressor 12 is controlled by governor 24. Governor 24 is a normally closed valve which receives a pressure signal from reservoir 14. When the air pressure within reservoir 14 reaches a set point, governor 24 opens, sending high pressure air to compressor control port 22, causing it to cycle to the unloaded condition. Simultaneously, the high pressure signal is directed to air dryer control port 26 and causes the air dryer to purge, as will be explained below. Check valve 28 is placed in the air line between air dryer 16 and reservoir 14, which prevents air leak-back to maintain reservoir air pressure when the compressor is unloaded. Air supply system 10 further incorporates pressure reducing valve 30 causing a pressure reduction between air supplied from air dryer delivery port 32 as compared with the pressure supplied to reservoir 14.

Figure 2:
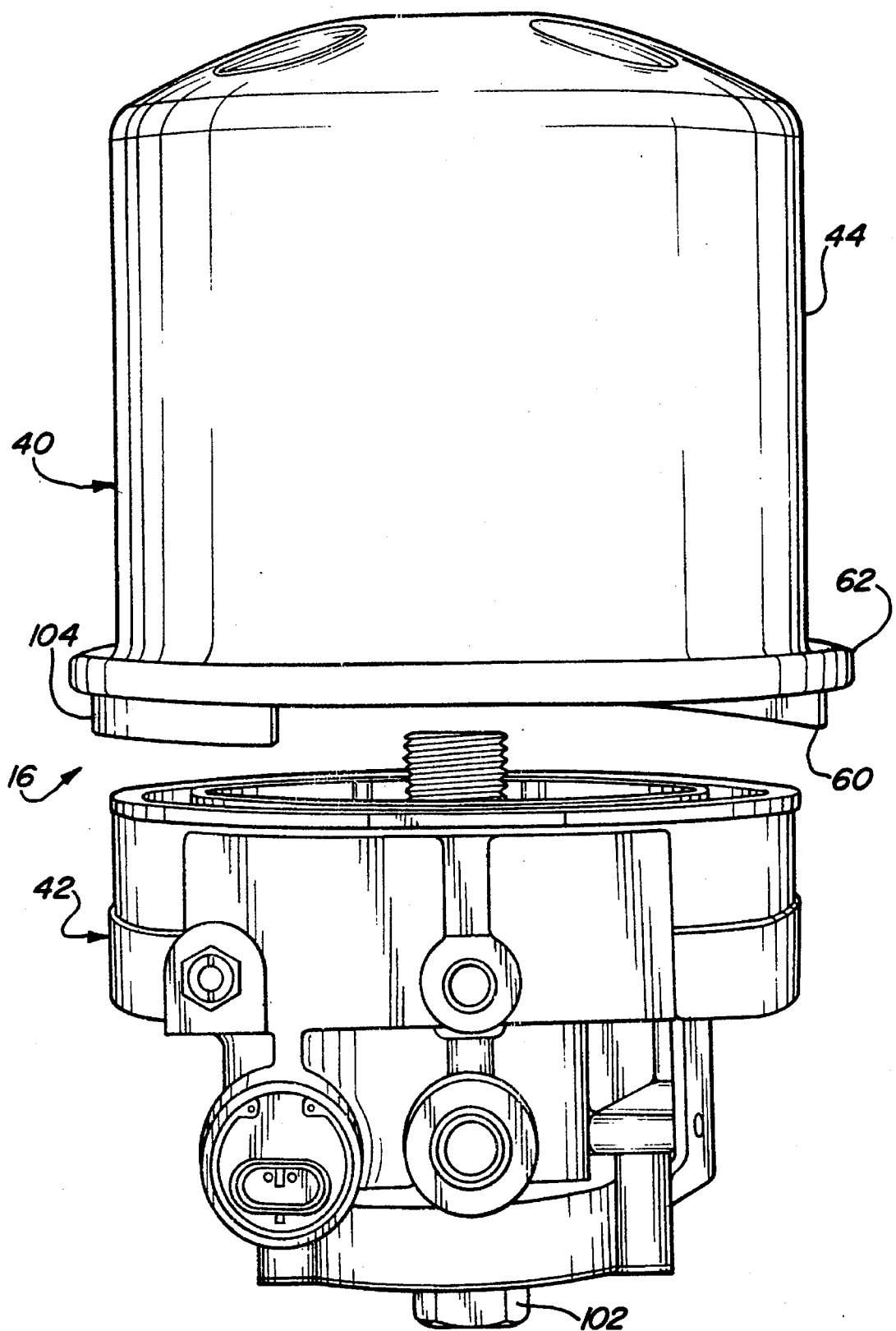
FIG. 2 is an exploded elevational view of an air dryer representative of a type which may be incorporated in the air supply system of the present invention.
Figure 3:
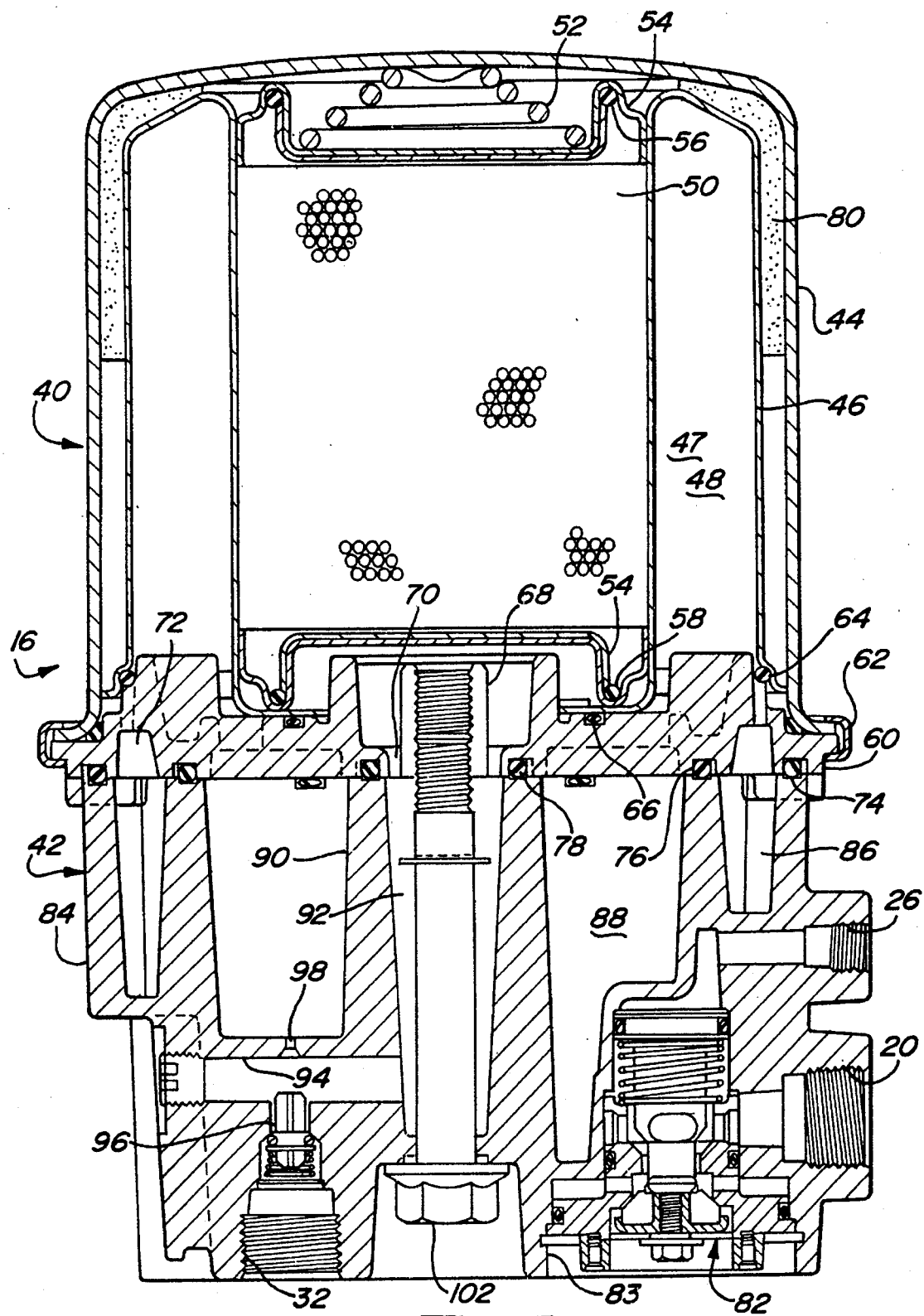
FIG. 3 is a cross-sectional view through the air dryer of FIG. 2 showing internal components of the device.

Various types of air dryers can be incorporated within air supply system 10 in accordance with this invention. An example of an air dryer incorporating an integral purge volume is illustrated in FIGS. 2 and 3.

Air dryer 16 includes a removable cartridge 40 and a lower body assembly 42. Details of the construction of cartridge 40 are best described with reference to FIG. 3. Cartridge 40 has a drawn sheet metal cup-shaped outer shell 44. Double-wall inner sleeve 46 is disposed within outer shell 44 and defines a radial clearance passageway 47 around its outer perimeter, and further defines an annular interior cavity 48. Disposed within the inside cylindrical surface of inner sleeve 46 is desiccant bed 50. Desiccant bed 50 is comprised of a bead like granular material which has hydrophilic properties. The material comprising desiccant bed 50 is compressed by spring 52 and is retained by cloth sack 54 covering the upper and lower ends of the desiccant bed. Cloth sack 54 is maintained in position by O-rings 56 and 58. Spring 52 maintains desiccant bed 50 in a densely packed condition for optimal performance.

Air dryer cartridge outer shell 44 and inner sleeve 46 are affixed to load plate 60. As shown, outer shell 44 is affixed to load plate 60 by a rolled perimeter band 62. O-rings 64 and 66 are used to provide isolated volumes within cartridge 40, as will be described in greater detail below. At the center of load plate 60 is internally threaded boss 68. Apertures 70 around boss 68 create a flow passageway. An outer groove 72 in the bottom surface of load plate 60 communicates with cartridge outer passageway 47 through internal passageways (not shown). O-rings 74, 76 and 78 are positioned within concentric grooves on the bottom surface of load plate 60 for sealing engagement with features of lower body assembly 42, as will be described in greater detail as follows. Porous filter 50 is positioned in the upper portion of cartridge outer passageway 47 and performs a filtration function, collecting particulates and oil.

Lower body assembly 42 defines supply port 20 which receives compressed air from compressor discharge port 18. Control port 26 receives the compressor control signal. Delivery port 32 discharges de-watered compressed air. Purge valve assembly 82 is positioned within purge port 83 in lower body casting 84 and communicates with supply port 20 and control port 26.

Lower body casting 84 defines three separate concentric internal cavities. Outer cavity 86 in the form of a perimeter groove is positioned between O-rings 74 and 76, and opens between the O-rings. Intermediate cavity 88 surrounds upstanding central boss 90 which is hollow, defining central passage 92. A radially drilled bore 94 communicates central passage 92 with delivery port 32, having check valve 96 installed therein. A small orifice 98 communicates intermediate cavity 88 with bore 94.

Cartridge 40 and lower body assembly 42 are fastened together by tightening bolt 102. The action of torquing bolt 102 pulls cartridge 40 and lower body assembly 42 tightly together. Cartridge 40 is prevented from rotating by interlocking between tabs 104 and features on lower body assembly 42. Compression of O-rings 74, 76 and 78 creates distinct chambers, each partly comprised by cartridge 40 and lower body assembly 42. Specifically, lower body outer cavity 86 communicates with cartridge outer passageway 47, lower body intermediate cavity 88 communicates with cartridge annular interior cavity 48, and desiccant bed 52 communicates with central passage 92

Operation of air dryer 16 will now be described with particular reference to FIG. 3. In the loaded mode, compressor 12 supplies high pressure air to supply port 20. This air passes through purge valve assembly 82 and into lower body outer cavity 86 and into cartridge outer passageway 47. Air thus flows upwardly through filter 80 where particulate contaminants and oil are stripped from the air flow. Air then passes to the top of outer shell 44 and downwardly through desiccant bed 50 which strips water from the compressed air. The dry air then passes around threaded boss 68, through apertures 70 and into lower body central passage 92. The clean dry air then exits through check valve 96 and delivery port 32. During the compressor loaded mode, this high pressure air is allowed to flow through orifice 98 into an integral purge volume defined by lower body intermediate cavity 88 and cartridge inner sleeve annular interior cavity 48. Thus, this purge volume reaches the pressure of air flowing from delivery port 32.

In operation of air supply system 10, once the pressure in reservoir 14 has reached a set point, a high pressure air signal is sent through governor 24 to compressor control port 22 and air dryer control port 26. An internal diaphragm within purge valve assembly 82 closes air dryer supply port 20 and opens lower body outer chamber 86 to atmosphere through purge port 83. Air cannot escape the unit through delivery port 32 due to the action of check valve 96. When this occurs the compressed air stored within the purge volume slowly leaks from orifice 98 toward purge valve assembly 82, generating a reverse air flow upwardly through lower body central passage 92 and through desiccant bed 50. This reverse purging air flow causes water to be stripped from the desiccant bed as well as some oil and solid contaminants from filter 80.

In air supply systems in accordance with the prior art, air delivered at compressor discharge port 18 is directed through air dryer 16 through check valve 28 and into reservoir 14. Except for flow restrictions, the pressure of air delivered to reservoir 14 is the same as that delivered by compressor 12. This pressure is typically about 120 pounds per square inch gage (PSIG) and is also the pressure of air which charges the air dryer purge volume. The total cubic feet of air stored within the purge volume at standard atmospheric conditions is a function of the volumetric size of the purge volume, as well as the compressor discharge pressure. In accordance with the present invention, the cubic feet of air measured at standard conditions stored within the purge volume is significantly increased through the use of pressure reducing valve 30 installed in the discharge air line between air dryer 16 and reservoir 14. For example, pressure reducing valve 30 could provide a pressure reduction of 30 PSI. Therefore, the normal discharge pressure of compressor 12 is increased from about 120 PSIG to about 150 PSIG. Reservoir 14 however is charged to the same pressure as in typical systems, ie. approximately 120 PSIG. However, the higher pressure air charges the air dryer purge volume with an increased volume of air measured at standard conditions. In experiments with air supply system 10, an increase in air dryer capacity in terms of air volume at standard conditions was increased by 13% which provides more complete purging of desiccant bed 52. This enhancement in air dryer purge capacity is provided with a minimum of modification to the existing air supply system. The features can be provided through incorporating pressure reducing valve 30 as an additional component or employing a modified check valve 28 (or other component) having a pressure reduction characteristic. The system could be further modified with a control mechanism which detects operating or atmospheric conditions in which higher purge capacity is needed to activate pressure reducing valve 30. In other conditions where enhanced purge capacity is not needed, pressure reducing valve 30 could be de-activated, causing the system to operate in its normal operating mode. Such control is provided by switch mechanism 106 which can be in the from of an environmental or operating condition monitor or be simply a manually operated switch activated by the vehicle operator.

It is to be understood that the invention is not limited to the exact construction illustrated and described above, but that various changes and modifications may be made without departing from the spirit and scope of the invention as defined in the following claims.

I claim:

1. An air supply system for a motor vehicle comprising:
   an air compressor cyclically actuatable from a loaded mode producing compressed air and an unloaded mode not producing said compressed air,
   a reservoir for storing said compressed air produced by said air compressor,
   an air dryer for absorbing water in said compressed air produced by said air compressor, said air dryer having a desiccant material for absorbing said water and a purge volume for storing purge air for purging said desiccant material when said compressor is in said unloaded mode,
   pressure reducing means for reducing the pressure of said compressed air delivered by said air compressor before said air is delivered to said reservoir whereby said purge volume is charged with air at a higher pressure than air delivered to said reservoir,
   connection means for transmitting said air from said air compressor to said air dryer and said reservoir, and
   control means for controlling said system to cyclically actuate said air compressor between said loaded mode for charging said reservoir and said purge volume, and said unloaded mode during which air charged in said purge volume purges said desiccant material.

2. An air supply system according to claim 1 further comprising said air supply system being part of an air brake system for a motor vehicle wherein said reservoir supplies said compressed air for control of vehicle service brakes.

3. An air supply system according to claim 1 further comprising said air compressor producing said compressed air at a pressure of about 150 PSIG.

4. An air supply system according to claim 1 further comprising said pressure reducing means providing a pressure reduction of about 30 PSIG.

5. An air supply system according to claim 1 further comprising said purge volume being integral with said air dryer.

6. An air supply system according to claim 1 further comprising said connection means having an air line connecting said air dryer and said reservoir and said pressure reducing means comprising a pressure reducing valve in said air line.

7. An air supply system according to claim 1 wherein said control means includes a governor which detects the pressure of said air in said reservoir and sends an air control signal to said air compressor to activate said air compressor between said loaded and said unloaded modes.

8. A method of operating an air supply system for a motor vehicle of the type having an air compressor cyclically actuatable from a loaded mode producing compressed air and an unloaded mode not producing said compressed air, a reservoir for storing said compressed air produced by said air compressor, an air dryer for absorbing water in said compressed air produced by said air compressor during said loaded mode, said air dryer having a purge volume for storing purge air for purging a desiccant when said compressor is said unloaded mode, comprising the steps of:
   connecting said air from said air compressor to said air dryer and said reservoir,
   reducing the pressure of said compressed air delivered by said air dryer before said air is delivered to said reservoir whereby said purge volume is charged with air at a higher pressure than air delivered to said reservoir, and
   controlling said system to cyclically actuate said air compressor between said loaded mode for charging said reservoir and said purge volume, and said unloaded mode during which air charged in said purge volume purges said desiccant.

9. The method according to claim 8 further comprising causing said air compressor to produce said compressed air at a pressure of about 120 PSIG.

10. The method according to claim 8 further comprising wherein the step of reducing the pressure provides a pressure reduction of about 30 PSI.

\* \* \* \* \*